No. 629,682.

P. C. HEWITT.
CONDENSER.
(Application filed June 1, 1897.)

(No Model.)

Patented July 25, 1899.

2 Sheets—Sheet 1.

WITNESSES:
Geo. M. Hopkins.
John a Bergstrom

INVENTOR
P. C. Hewitt.
BY
Munn
ATTORNEYS.

No. 629,682. Patented July 25, 1899.
P. C. HEWITT.
CONDENSER.
(Application filed June 1, 1897.)

(No Model.) 2 Sheets—Sheet 2.

UNITED STATES PATENT OFFICE.

PETER COOPER HEWITT, OF NEW YORK, N. Y.

CONDENSER.

SPECIFICATION forming part of Letters Patent No. 629,682, dated July 25, 1899.

Application filed June 1, 1897. Serial No. 639,013. (No model.)

*To all whom it may concern:*

Be it known that I, PETER COOPER HEWITT, of New York city, in the county and State of New York, have invented new and useful Improvements in Condensers, of which the following is a specification.

This invention relates to condensers for producing a controlled magnetic field.

The object of the invention is to produce a condenser which will induce currents in a secondary.

I will describe one form of condenser embodying my invention.

Reference is to be had to the accompanying drawings, forming a part of this specification, in which similar characters of reference indicate corresponding parts in both views.

Figure 1:
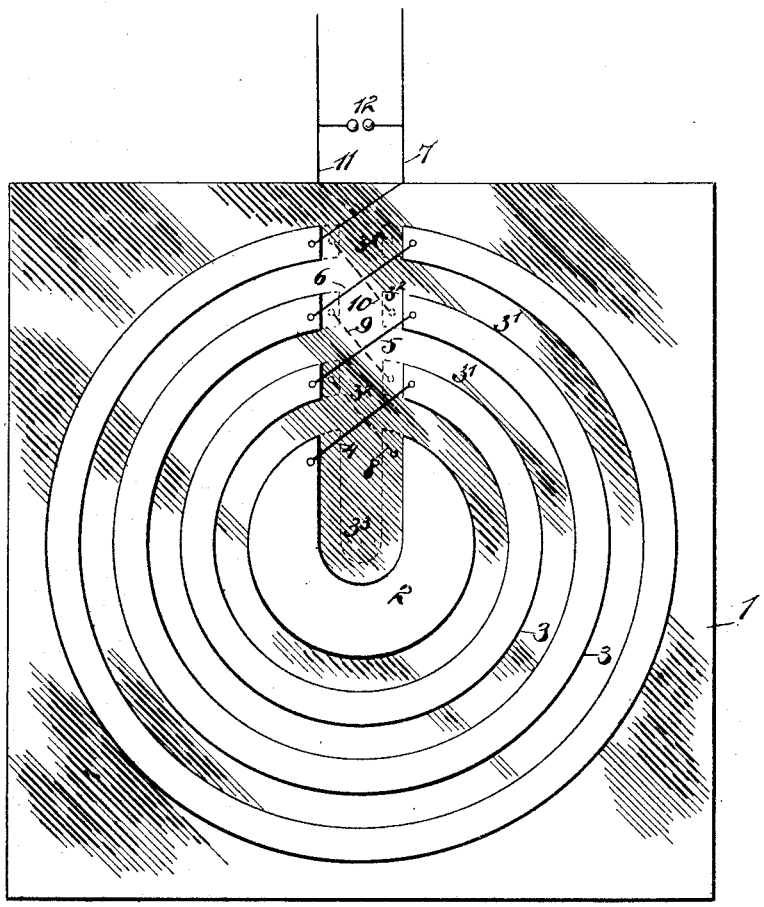
Figure 2:
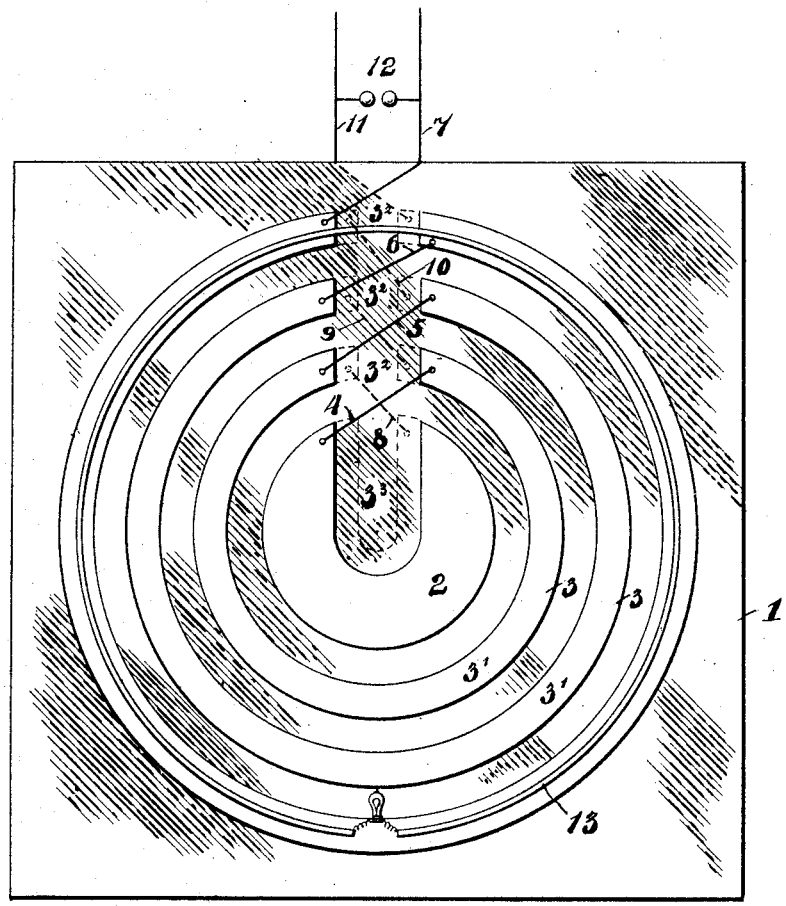

Figure 1 is a plan view of a form of condenser embodying my invention, and Fig. 2 shows a condenser and a secondary.

The condenser shown in the drawings comprises a plate 1, of glass, on the opposite sides of which are arranged coatings of tin-foil cut in a series of rings 3, arranged concentrically with intermediate open spaces 3', there being an open space $3^2$ in each ring. In the center of the series of rings is placed a coating 2, of tin-foil, having an open space $3^3$ in one side extending inwardly. The central coating 2 and the ends of the several rings of each set are so connected together as to practically form a continuous spiral, the spiral on one side being extended in an opposite direction to that of the other side. To form this spiral trend, the center 2 of one side has a connection 4 with one end of the ring surrounding it. The other end of the said ring has a connection 5 with the diagonally opposite end of the next ring, and the other end of this ring has a connection 6 with the diagonally opposite end of the next ring, and from the opposite end of this outer ring extends a connection 7.

The center and rings on the opposite side will be similarly connected, but in an opposite direction, as indicated by the connections 8, 9, and 10. (Shown in dotted lines.) A lead-wire 11 will extend from the outer ring at the end opposite to that of the connection 7. The center and rings upon one side of the glass are arranged opposite the center and rings on the opposite side of the glass. With the foils arranged in this manner, one side of the condenser being positively charged and the other side negatively charged, the condenser when discharged develops a magnetic field capable of producing an electric current in a circular wire or spiral secondary 13, placed near it in a plane parallel to the condenser. This secondary is sufficient to light a lamp.

The condenser may be charged and discharged in the same manner as any other condenser, and a number of them may be arranged in parallel or in series to suit the current and the purpose for which they are to be used. The connections 7 and 11 may be provided with discharge-rods 12 to limit the charge. The number of turns in each condenser and the number of condensers (like the one shown) to be placed one above the other with a dielectric interposed will depend on the voltage of the current used and the purpose for which it is to be used. The condenser is connected with any suitable source of electric current or the terminals of the secondary of an induction-coil or converter having its primary connected with an alternating generator. The spark-gap, which is connected with the condenser, serves to limit the charge of the condenser and discharge it.

I have shown one form of condenser embodying my invention, but the same principle may be carried out in a cylindrical form—that is to say, strips of tin-foil may be arranged on the inner surface of a glass tube or any other dielectric and other strips arranged on the outer side of the tube and connected spirally in an opposite direction in the same manner as shown above, or the form of the condenser and arrangement of the conductors may be otherwise varied to produce the effect desired. This form of condenser is capable of being charged by a varying magnetic field, as well as being capable of producing a magnetic field when the charge is varied.

By arranging the metal surfaces spirally, as shown, the charge of the condenser at the instant of the discharge is caused to start on the whole surface, following the trend of such metal surfaces. It is well known that no movement of electricity in or on a conductor can take place without a corresponding electromagnetic effect, a definite result being produced by causing the discharge to follow a definite direction on the condenser-coating; but when this discharge takes place from a rectangular or other condenser surface having a form not adapted for definitely controlling the direction of the electrical discharge, but allows the discharge to proceed over the surface of the condenser in any direction it may take without being forced to proceed in a given path, the effect is heterogeneous. In this invention the magnetic effect is centralized by causing the discharge to follow the path in the coatings which is required by the electrical laws to produce the desired effect—viz., that the condenser shall create a magnetic field which shall be centralized, so as to produce an electric current in a secondary—for example, like the condenser here shown.

The condenser acts as a condenser and spiral without the losses due to having them separate.

The electromagnetic effects of the condenser are not as yet fully understood, but the fact has been determined that the condenser produces a controllable field that is secured in this way more easily than in any other way known to me. Electromagnetic effects of great variety may be produced by slight variations in the form of the condenser.

Having thus described my invention, I claim as new and desire to secure by Letters Patent—

1. An electric condenser, comprising a dielectric with coatings each having a spiral trend, one right and the other left, substantially as specified.

2. An electric condenser, comprising a plane dielectric, and conductors on opposite sides of the said dielectric, the conductors being arranged spirally, the spiral on one side being arranged in a direction opposite that of the spiral of the other side, substantially as specified.

3. An electric condenser, comprising a dielectric, and concentric rings of foil, there being a space between the ends of each ring; the series of rings on either side being connected together to substantially form spirals, as specified.

4. An electric condenser, comprising two conductors insulated from each other and arranged to cause the electric discharge through them to take place in opposite directions, and means for charging and discharging.

5. An electric condenser, comprising a dielectric, with coatings formed to cause the discharge of each coating in a definite direction and opposite to the direction of the discharge of the other coating.

PETER COOPER HEWITT.

Witnesses:
EVERARD BOLTON MARSHALL,
F. W. HANAFORD.